(12) United States Patent
Miller et al.

(10) Patent No.: US 7,664,944 B2
(45) Date of Patent: *Feb. 16, 2010

(54) BOOTING FROM A COMPRESSED IMAGE

(75) Inventors: Wesley G. Miller, Sammamish, WA (US); Richard Allen Pletcher, Redmond, WA (US); Bruce L. Green, Sammamish, WA (US); Jason Cohen, Seatac, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/459,560

(22) Filed: Jul. 24, 2006

(65) Prior Publication Data

US 2006/0259754 A1 Nov. 16, 2006

Related U.S. Application Data

(63) Continuation of application No. 10/608,350, filed on Jun. 27, 2003, now Pat. No. 7,120,786, which is a continuation-in-part of application No. 10/172,953, filed on Jun. 17, 2002, now Pat. No. 6,947,954, and a continuation-in-part of application No. 10/173,297, filed on Jun. 17, 2002, now Pat. No. 7,017,144.

(51) Int. Cl.
*G06F 9/24* (2006.01)
*G06F 9/00* (2006.01)
*G06F 1/24* (2006.01)
*G06F 12/00* (2006.01)

(52) U.S. Cl. .............................. 713/2; 713/1; 713/100; 707/200

(58) Field of Classification Search ................... 713/1, 713/2, 100; 707/200
See application file for complete search history.

(56) References Cited

U.S. PATENT DOCUMENTS

| 5,155,594 | A | 10/1992 | Bernstein et al. |
| 5,267,330 | A | 11/1993 | Masuda |
| 5,307,497 | A | 4/1994 | Feigenbaum et al. |
| 5,467,441 | A | 11/1995 | Stone et al. |
| 5,519,869 | A | 5/1996 | Payne et al. |
| 5,694,201 | A | 12/1997 | Hayashi et al. |
| 5,758,165 | A | 5/1998 | Shuff |

(Continued)

FOREIGN PATENT DOCUMENTS

JP 04-360246 12/1992

(Continued)

OTHER PUBLICATIONS

Microsoft TechNet, "How NTFS Works", updated Mar. 28, 2003, retrieved from http://technet.microsoft.com/en-us/library/cc781134.aspx.*

(Continued)

*Primary Examiner*—Ji H Bae
(74) *Attorney, Agent, or Firm*—Senniger Powers LLP

(57) ABSTRACT

Accessing files within a compressed image to boot from the compressed image. In one embodiment, the compressed image includes a boot environment and a software image combined to reduce file redundancy. The invention boots into the boot environment within the compressed image to install the software image on a computer.

19 Claims, 4 Drawing Sheets

U.S. PATENT DOCUMENTS

| | | | | |
|---|---|---|---|---|
| 5,887,164 | A * | 3/1999 | Gupta | 713/2 |
| 5,940,871 | A | 8/1999 | Goyal et al. | |
| 6,098,158 | A | 8/2000 | Lay et al. | |
| 6,122,734 | A | 9/2000 | Jeon | |
| 6,131,192 | A | 10/2000 | Henry | |
| 6,167,562 | A | 12/2000 | Kaneko | |
| 6,279,109 | B1 | 8/2001 | Brundridge | |
| 6,304,965 | B1 | 10/2001 | Rickey | |
| 6,357,000 | B1 | 3/2002 | Jain | |
| 6,374,266 | B1 * | 4/2002 | Shnelvar | 707/204 |
| 6,374,353 | B1 | 4/2002 | Settsu et al. | |
| 6,434,695 | B1 | 8/2002 | Esfahani et al. | |
| 6,453,363 | B1 | 9/2002 | Slivka et al. | |
| 6,463,535 | B1 | 10/2002 | Drews | |
| 6,636,958 | B2 | 10/2003 | Abboud et al. | |
| 6,658,563 | B1 | 12/2003 | Ice, Jr. et al. | |
| 6,701,513 | B1 | 3/2004 | Bailey | |
| 6,718,548 | B1 | 4/2004 | Hsial | |
| 6,721,002 | B1 | 4/2004 | Dotsubo et al. | |
| 6,751,357 | B2 | 6/2004 | Boon | |
| 6,763,150 | B1 | 7/2004 | MacDonald | |
| 6,763,515 | B1 | 7/2004 | Vazquez et al. | |
| 6,782,402 | B1 | 8/2004 | Hidaka et al. | |
| 6,868,539 | B1 | 3/2005 | Travison et al. | |
| 6,877,154 | B2 | 4/2005 | Nagashima et al. | |
| 6,938,211 | B1 | 8/2005 | Chang et al. | |
| 6,944,865 | B1 | 9/2005 | Zurawski | |
| 6,947,659 | B2 | 9/2005 | Nishi et al. | |
| 6,976,058 | B1 | 12/2005 | Brown et al. | |
| 7,017,144 | B2 * | 3/2006 | Cohen et al. | 717/100 |
| 7,120,786 | B2 * | 10/2006 | Miller et al. | 713/1 |
| 2001/0044904 | A1 * | 11/2001 | Berg et al. | 713/201 |
| 2002/0129233 | A1 | 9/2002 | Hillis et al. | |
| 2002/0161932 | A1 | 10/2002 | Herger et al. | |
| 2003/0101162 | A1 * | 5/2003 | Thompson et al. | 707/1 |
| 2003/0188147 | A1 * | 10/2003 | Hsu | 713/1 |
| 2004/0218902 | A1 | 11/2004 | Yanagita | |

FOREIGN PATENT DOCUMENTS

| | | |
|---|---|---|
| JP | 2001331308 | 11/2001 |
| JP | 2002-236587 | 8/2002 |
| WO | 00/77614 A2 | 12/2000 |

OTHER PUBLICATIONS

Khalidi et al., "Extensible File Systems in Spring," Proceedings of the Fourteenth ACM Symposium on Operating Systems Principles, 1993, pp. 1-14, ACM press, New York, U.S.A.

Heidemann et al., "File-System Development with Stackable Layers," ACM Transactions on Computer Systems (TOCS), Feb. 1994, pp. 58-89, vol. 12, Issue 1, ACM Press, New York, U.S.A.

Rubini, "Kernel Korner: Booting the Kernel," Linux Journal, Jun. 1997, 7 pages, vol. 1997, Issue 38es, Specialized Systems Consultants, Inc., Seattle, WA, U.S.A.

Helander et al., "MMLite: A Highly Componentized System Architecture," Proceedings of the 8th ACM SIGOPS European Workshop on Support for Composing Distributed Applications, 1998, pp. 96-103, ACM Press, New York, U.S.A.

Solomon et al., Inside Microsoft Windows 2000 Third Edition, Microsoft Press, 2000, pp. 46-87, 177-206, and 215-236.

Favelu et al., "Image-retrieval agent: integrating image content and text," Oct., 1999, IEEE Intelligent Systems, pp. 36-39.

Render et al., "An Object-Oriented Model of Software Configuration Management," ACM, 1991, pp. 127-139.

* cited by examiner

BOOTING FROM A COMPRESSED IMAGE

CROSS-REFERENCE TO RELATED APPLICATIONS

This application is a continuation of pending U.S. patent application Ser. No. 10/608,350, filed Jun. 27, 2003, which is a continuation-in-part of U.S. Pat. No. 6,947,954, filed Jun. 17, 2002, and U.S. Pat. No. 7,017,144, filed Jun. 17, 2002, all three of which are hereby incorporated herein by reference in their entirety for all purposes.

BACKGROUND

A computer typically relies on several steps to boot. Those skilled in the art are familiar with the typical boot process for a computer such as a personal computer. The basic input output system (BIOS) or other firmware boot code initializes the system which then initializes any devices (e.g., network, hard disk, or compact disc) from which to boot. At this point, the system initializes local boot code and launches a boot environment. The boot environment provides operating systems services or other resources to applications. The boot environment enables additional operations to be performed such as installing a software image of an application program (e.g., a word processing application program or a spreadsheet application program). However, the boot environment is often too large to be stored along with the software image on most computer-readable media. For example, with a software image size of 600 megabytes (MB) and a boot environment size of 150 MB, the 750 MB total exceeds the 680 MB maximum for optical media per ISO 9660.

Some existing systems provide a layered file system in which one layer compresses all data before writing it out to a medium and uncompresses all data read from the medium to save space on the medium. Such a file system may be implemented as a layer on top of a base file system existing on the medium. For example, such a system may mount a compressed tape archive (e.g., tar) file. However, such a system fails to provide a compressed, bootable software image.

Further, some existing systems allow a computer to boot from a compressed kernel. However, the kernel does not provide a rich boot environment such as provided by a minimal operating system. Other systems save a compressed image of an operating system in an extended memory area of a computer's physical memory and then boot (e.g., "soft boot") the computer from that static image. Still other systems compress portions of an operating system in a read-only memory image and execute the system from the compressed image. Yet other systems boot a system by first executing uncompressed BIOS code to enable memory and then uncompressing BIOS code as needed to complete the boot. However, these systems lack the ability for a computer to be able to boot from an image of a boot volume that is compressed, to reduce random access memory overhead on the computer, and to boot on any standard personal computer using standard boot firmware. Further, the existing systems lack the flexibility of having the compressed image exist as a file.

SUMMARY

Embodiments of the invention include a driver component providing access to a boot environment and a software image stored in a compressed image. In one embodiment, the invention includes a bootable compressed image comprising the boot environment and the software image which have been combined to reduce storage size on a computer-readable medium. The driver component operates to identify the boot environment in the compressed image, load the compressed image as a file system, and boot from the identified boot environment via the file system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
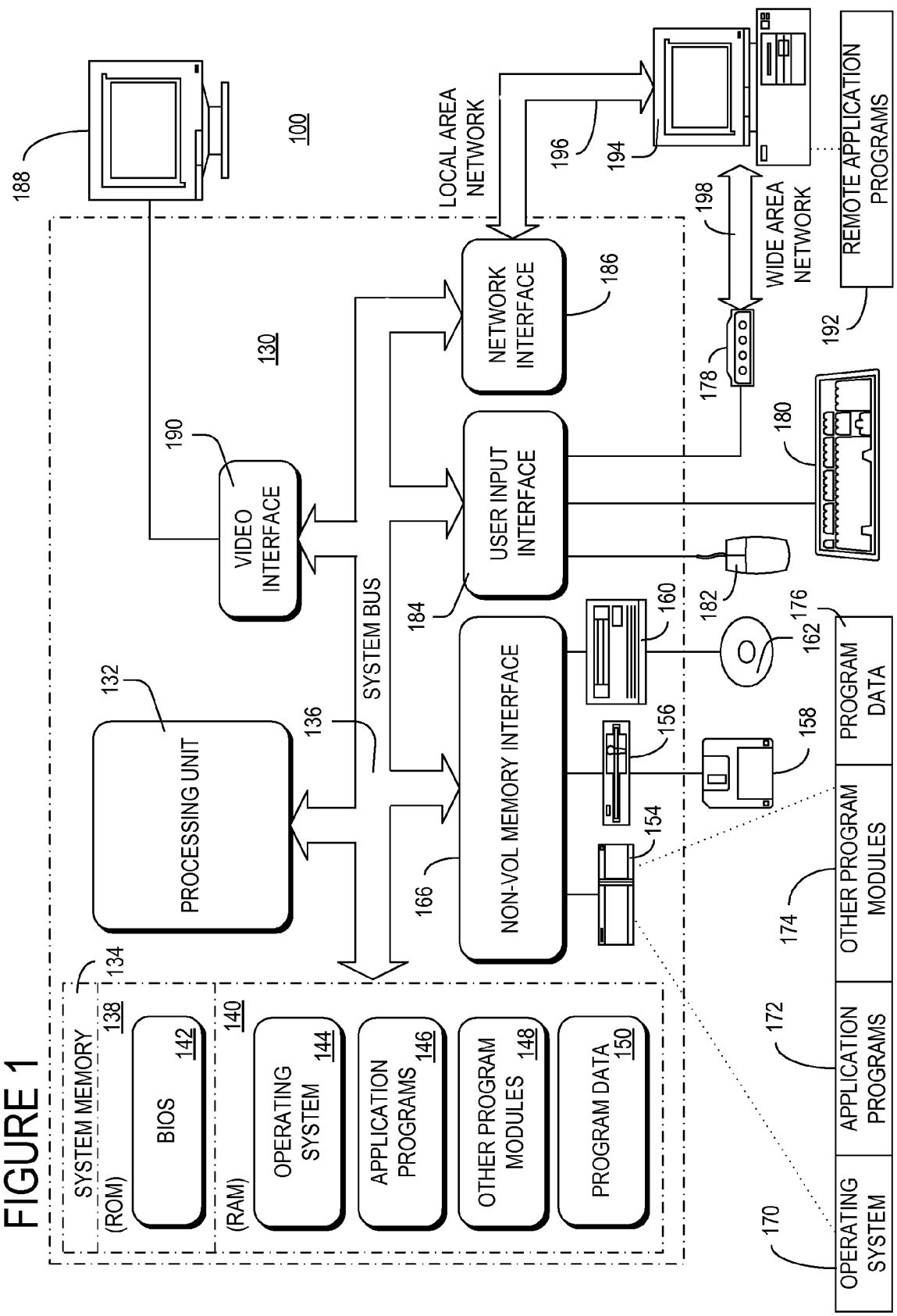
FIG. 1 is a block diagram illustrating one example of a suitable computing system environment in which aspects of the invention may be implemented.

Embodiments of the invention access a compressed image (e.g., a binary store) stored on a computer-readable medium. The compressed image comprises a plurality of files. In one embodiment, a driver component or other computer-executable code (e.g., driver code) identifies, loads, and boots from a boot environment stored within the compressed image. The boot environment provides operating systems services or other resources to applications. The boot environment enables additional operations to be performed such as installing a software image of an operating system or application program on a computer (e.g., a word processing application program or a spreadsheet application program). In one embodiment, the compressed image stores the software image and the boot environment in a combined format to reduce file redundancy. Aspects of the invention provide the compressed image as an image-based operating system that has the capability of booting itself. Embodiments of the invention overlay a file system listing the files within the compressed image over an existing file system.

Boot code loads the driver component in an aspect of the invention which is capable of reading the compressed image. By reading the compressed image and intercepting calls from the boot code and the operating environment within, the driver effectively emulates a software file system and allows the operating environment to boot. Booting a computer from a compressed image provides a boot environment that is compressed, compact, and portable (e.g., residing in one storage binary).

Building a binary image store or other compressed file or image that has the capability of being booted allows the operating environment to be compacted, transported, and booted from within a single cohesive binary. This allows for portability and speed of use. When combined with an image-based setup and single instance storage in one embodiment, the invention conveniently boots the operating environment and applies an operating system while conserving memory (e.g., saving several hundred megabytes of memory). Aspects of the invention yield an image-based operating system that has the capability of booting itself, provide a compressed image as a file to enable booting from an image of a boot volume that is compressed and to reduce random access memory overhead on the computer, and provide significant benefits to various applications including the embedded computer market where compact environments and easy replacement of the operating environment are essential.

Software, or other computer-executable instructions, boots from various computer-readable storage media including, but not limited to, flash memory, compact disc, and digital versatile disk (DVD) media to install or run an operating system stored on the computer-readable storage media or elsewhere. For example, a pre-install environment or other minimal operating system may be stored on a flash disk and accessible (e.g., via a universal serial bus) to perform one or more of the following tasks: deploy an operating system to a new or damaged system, recover an operating system installation or user files from a damaged system, maintain and support a running system, scan for viruses and repair an infected system, perform disk defragmentation and error checking, and manipulate and format partitions.

Embodiments of the invention differ from existing systems in many ways. For example, in an embodiment, data within the compressed image is utilized while the image as a whole is still compressed. That is, there is no need to uncompress the entire compressed image to utilize the data in the image. The embodiment uncompresses portions of individual files as needed rather than uncompressing the entire file. Existing systems uncompress files, store the uncompressed files in intermediate storage, and then boot from the uncompressed files. Embodiments of the present invention do not require such intermediate storage. While some existing file systems access compressed binaries without uncompressing the binaries for storage in local memory, these existing file systems lack a bootable, compressed image.

Exemplary Operating Environment

FIG. 1 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 1 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 1, provide storage of computer readable instructions, data structures, program modules and other data for the computer 130. In FIG. 1, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 1 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein include these and other various types of computer-readable storage media when such media contain instructions or programs for implementing the steps described below in conjunction with a microprocessor or other data processor. Aspects of the invention also include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

After powering on a computer such as computer 130, typical boot operations include the firmware (or hardware) initializing the system including the boot device (e.g., hard drive, network, optical media, etc.). The firmware passes control to the software. A boot sector or other boot specifier on the media device initializes software boot code. The boot code initializes and performs additional operations to complete the boot process.

For general information regarding the boot process and the operating system components available in the WINDOWS brand operating system, refer to Solomon and Russinovich, *Inside Microsoft Windows* 2000, $3^{rd}$ Edition, 2000, pages 46-87, 177-206, and 215-236, herein incorporated by reference.

Compressed Image Format

Figure 2:
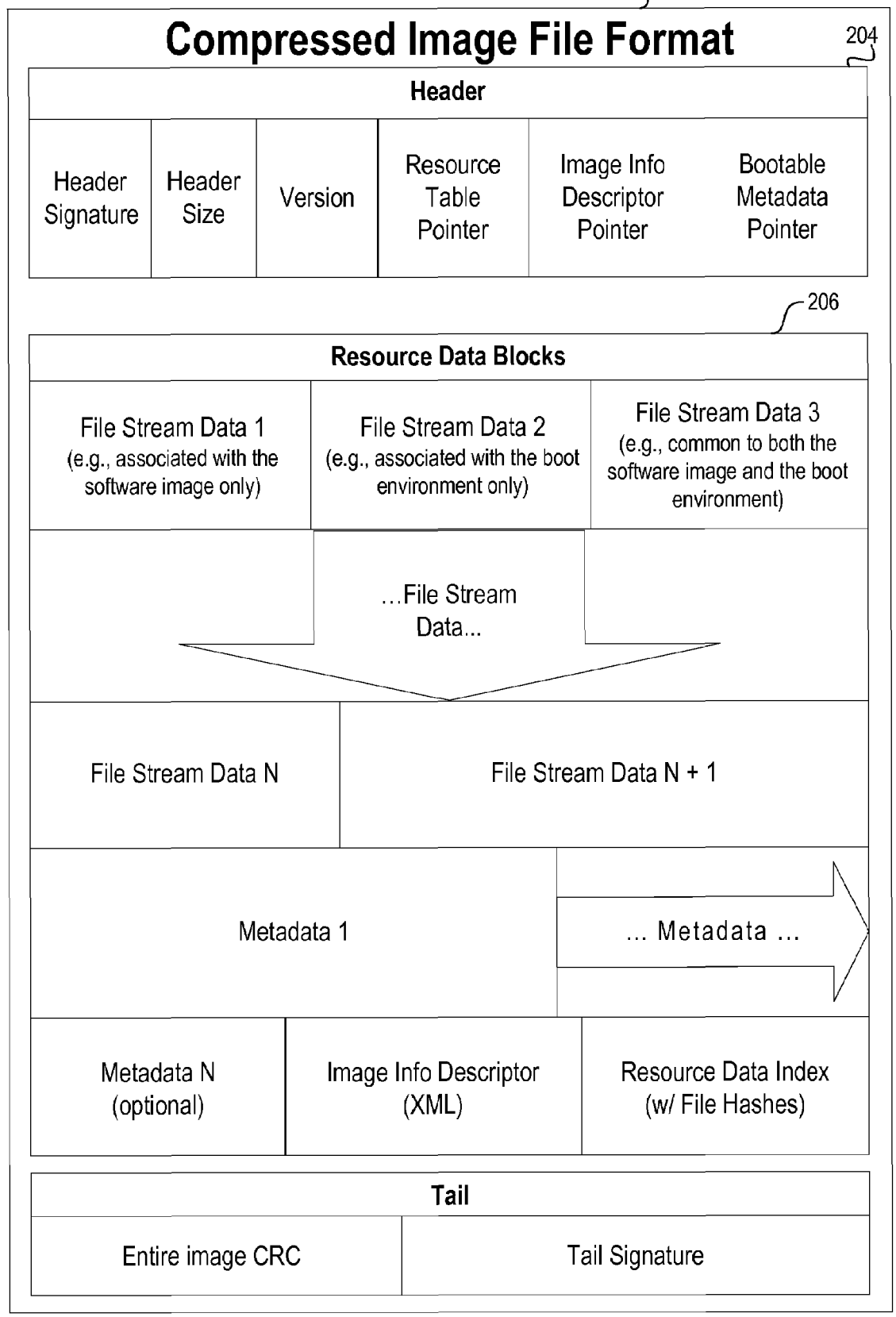
FIG. 2 is an exemplary block diagram illustrating a compressed image format.

Referring next to FIG. 2, a block diagram illustrates an exemplary compressed image format 202. Generally, the exemplary compressed image format 202 includes descriptive data (e.g., a header 204) and file data (e.g., resource data blocks 206). Exemplary descriptive data includes metadata such as one or more of the following: a file name, an attribute, a file update time, a compression format, a file location and a stream. Exemplary file data comprises file stream data.

In one embodiment as described herein, the software image and the boot environment have been combined to reduce file redundancy. That is, data common to both the software image and the boot environment is stored only once in the compressed image. The resource data blocks 206 in FIG. 2 illustrate the resulting combined image. For example, file stream data 1 stores a data block associated with the software image while file stream data 2 stores a data block associated with the boot environment. File stream data 3 stores a data block that is common to both the software image and the boot environment. Those skilled in the art will appreciate that any of the resource data blocks may be associated with either or both of the software image and the boot environment.

While described with reference to FIG. 2, embodiments of the invention are contemplated by the inventors to be operable with any form of compressed image format. An image of an operating system, application program, or other data represents a copy of the memory area storing the data. For example, an image may represent a copy of an installed operating system, application, or utility that may be distributed to other computers.

Those skilled in the art will note that the image structure 202 of FIG. 2 is merely exemplary. It is contemplated by the inventors that embodiments of the invention are operable with any image format.

Booting from the Compressed Image

Figure 3:
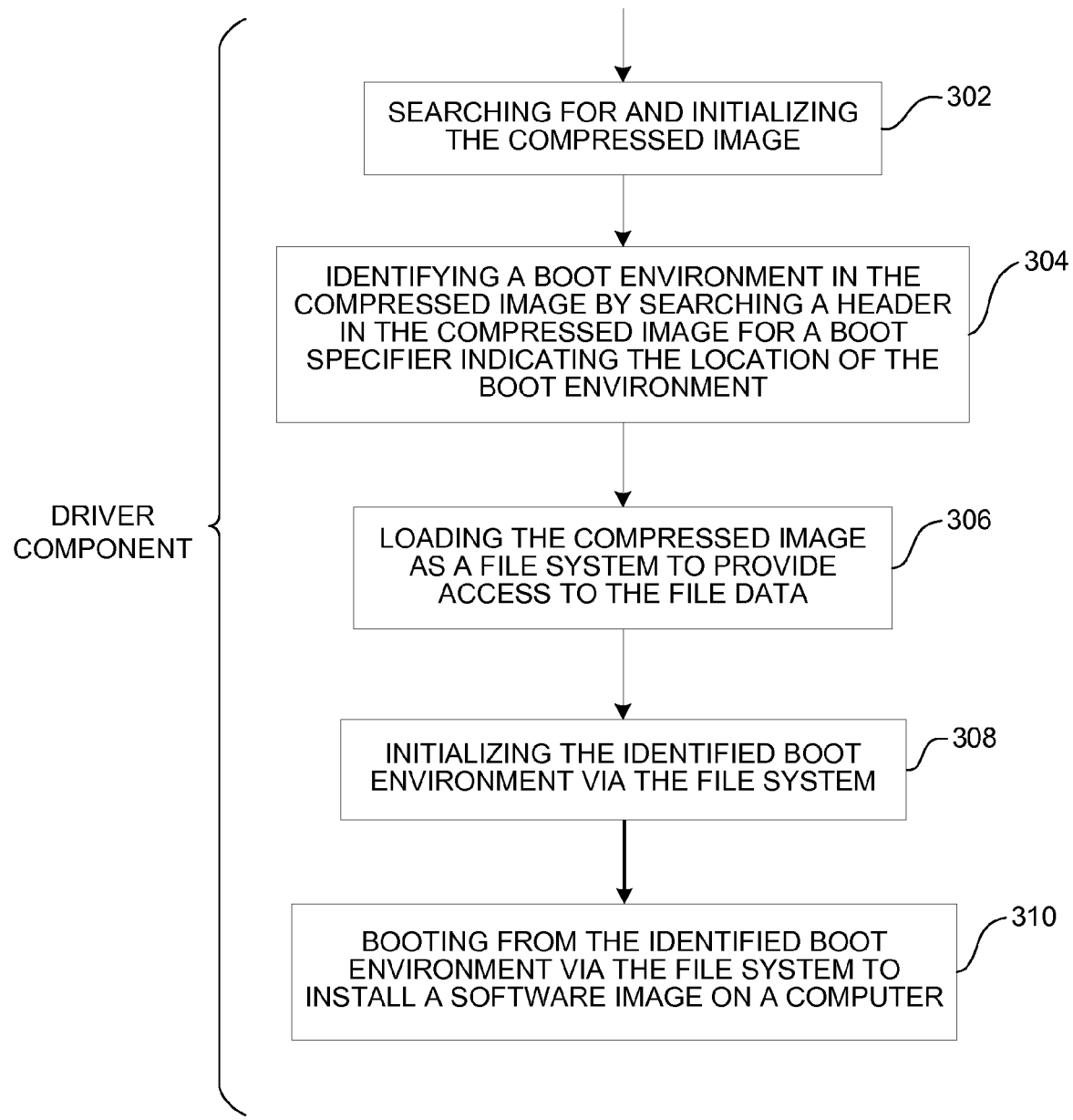
FIG. 3 is an exemplary flow chart illustrating operation of a driver component.

Referring next to FIG. 3, an exemplary flow chart illustrates operation of a driver component. In general, embodiments of the invention software access the compressed image comprising the boot environment and the software image stored on a computer-readable medium. In one form, the boot environment and software image include a plurality of files combined to reduce file redundancy. An embodiment of the invention software includes a driver component that executes to perform the method illustrated in FIG. 3. In particular, the driver component seeks or otherwise searches for the compressed image and initializes or otherwise opens the compressed image on the computer-readable medium at 302. The driver component further identifies the boot environment in the compressed image by searching a header for a boot specifier indicating the location of the boot environment on the computer-readable medium at 304. The driver component also loads the compressed image as a file system at 306 and initializes the identified boot environment at 308. The driver component boots from the identified boot environment via the file system to install the software image on a computer at 310.

In one embodiment, the driver component executes in the context of a running operating system. Further, the driver component may be embodied in one or more of the following: software, firmware, and hardware. The software image comprises an operating system and/or an application program. The boot environment includes any form of operating system including, but not limited to, a minimal operating system or a full operating system. One or more computer-readable media have computer executable instructions for performing the method illustrated in FIG. 3.

In an embodiment, the boot process of the invention for a computer or other computing device includes the following operations. After powering on, hardware or firmware associated with the computer initializes the system. Firmware initializes the boot device (e.g., hard drive, network, or optical media) and passes control to software. A boot sector or other boot specifier on the medium initializes software boot code. The software boot code initializes and launches the driver component (e.g., fs_ext.sys). The driver component seeks the compressed image file (e.g., image.wim). If the compressed image is not found, the boot code proceeds to boot as in an existing system. That is, an embodiment of the invention software proceeds with a typical boot process if a compressed image file was not located.

If the driver component locates the compressed image, the driver component initializes or otherwise opens the compressed image file. The driver component seeks through the compressed store to find a boot environment. In one embodiment, the driver component executes to search a header for a boot sector, specifier, pointer to metadata, or other metadata identifying the location of the boot environment (e.g., via a pointer). To access the files within the compressed image, the driver component loads the compressed image as a file system. That is, the driver component interprets the data in the compressed image as a list of the files available within the compressed image. In particular, the driver component interprets metadata associated with the compressed image as a list of files stored within the compressed image. The metadata identifies and locates the files within the compressed image. That is, the metadata associates individual files and file streams with resource data blocks within the compressed image. The driver component initializes the boot environment and boots from the initialized boot environment. The driver component uncompresses selected files in the boot environment and boots from the selected files executing in local memory without storing the selected files in memory. That is, an embodiment of the invention boots from the boot environment via the uncompressed files without storing the uncompressed files in memory.

By loading the compressed image as a file system, the driver component provides transparent access to the compressed image allowing the boot environment to boot normally as it would from standard physical media. While other methods of mounting a file system are known in the art, these methods fail to provide access to a compressed and bootable software image. By abstracting the compressed image as a file system, the driver component reduces the need for special code in the boot environment to access the compressed image.

In one example, a computer-readable medium according to an aspect of the invention may appear to only store a boot time driver (e.g., nt1dr), a boot loader (e.g., boot.ini), and a compressed image file (e.g., image.wim) prior to execution of the driver component. After the driver component has overlaid the compressed image as a file system (e.g., decoded and virtually overlaid the files within image.wim over the base file system of the media), a computer-readable medium may appear to also store additional files that were encoded within the compressed image.

In one embodiment, a boot-time driver or other boot code loads the driver component (e.g., fs_ext.sys executing in the loader environment) to interpret the compressed image as a file system. Another driver component (e.g., a file system driver such as wimfs executing in protected mode) is subsequently loaded to interpret the compressed image as a file system during run-time. The driver components (e.g., fs_ext.sys and wimfs) receive file application program interface (API) calls from application programs and execute those calls on the compressed image as if the compressed image was organized according to a file system.

Alternatively or in addition, the compressed image includes descriptive data and file data. In one embodiment, the descriptive data includes metadata including one or more of the following: a file name, an attribute, a file update time, a compression format, a file location and a stream. The file data comprises binary file data.

Combining the Boot Environment and the Software Image

Figure 4:
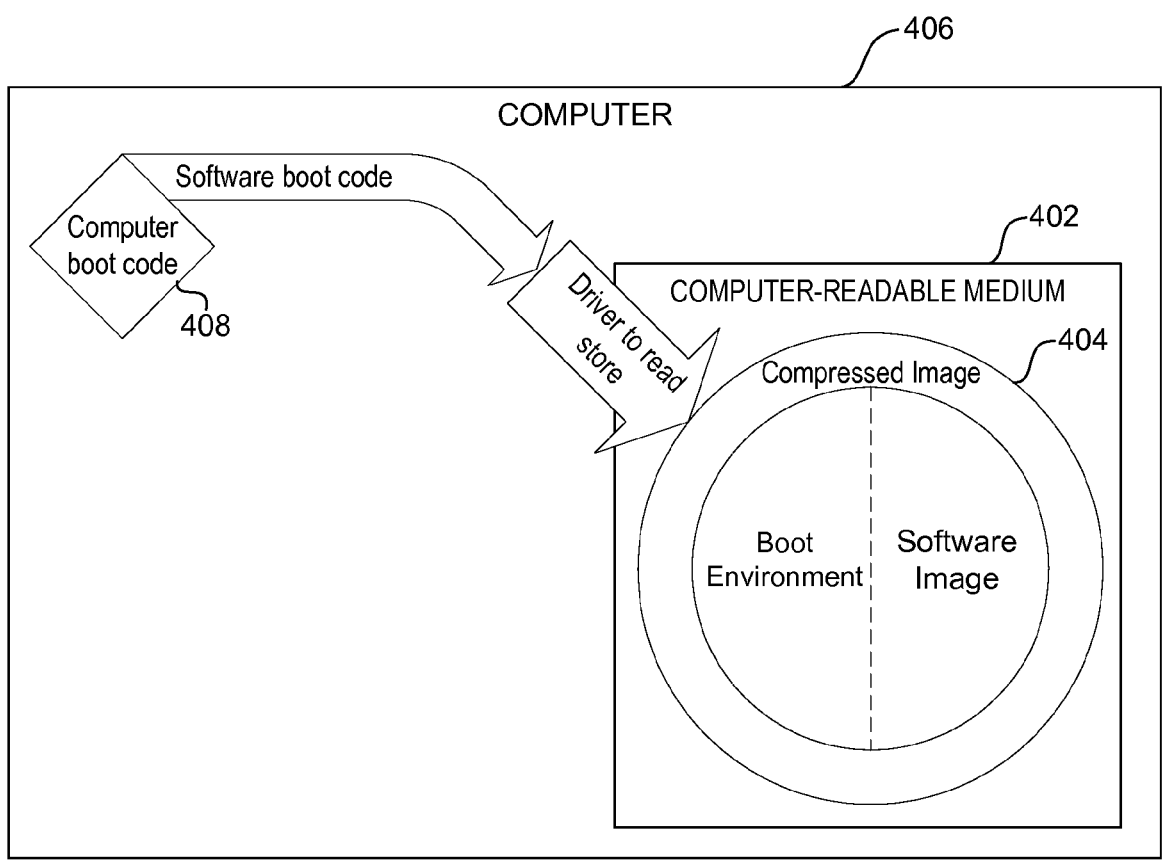
FIG. 4 is a block diagram illustrating an exemplary computer-readable medium on which embodiments of the invention may be stored.

Referring next to FIG. 4, a block diagram illustrates an exemplary computer-readable medium 402 on which data structures of embodiments of the invention may be stored. The computer-readable medium 402 stores a compressed data structure such as compressed image 404 including the boot environment and the software image. In FIG. 4, the boot environment and the software image have been combined to reduce file redundancy. The computer-readable medium 402 shown in FIG. 4 is associated with a computer 406 or other computing device. Computer boot code 408 in the computer 406 includes software boot code which loads the driver component. The driver component interprets the compressed image 404 to identify the files stored therein. Although illustrated in FIG. 4 in connection with the computer 406, the computer-readable medium 402 is contemplated by the inventors to be located anywhere accessible to the computer 406 (e.g., remotely from the computer 406) and to comprise both removable and non-removable media.

When creating the compressed image 404, an image representing, for example, an installation of an operating system is compressed to create the compressed image 404 for delivery to a customer. The compressed image 404 is added to medium 402 storing the bootable run-time environment (e.g., an operating system with minimal functionality) for delivery to the customer. However, there are many files in the compressed image 404 that are also present in the bootable run-time environment. As such, there are two copies on the medium 402 of those duplicate files. In one embodiment, the compressed image 404 is stored separately from the bootable run-time environment on the medium 402. In an alternative embodiment, the software image and the run-time environment are combined to form one image 404. Combining the images includes eliminating file duplicity between the software image and the run-time environment to reduce the storage size of the resulting, combined image 404 stored on the medium 402.

Embodiments of the invention are operable with any algorithm for combining images. For example, one such algorithm may create a single combined image from multiple individual images by (1) separating the descriptive data (e.g., metadata) describing the files within each individual image from the actual data of the files themselves, and (2) separating data within each individual image that is common across multiple images. Each of the descriptive data blocks of each individual image is included in the combined image whereas only a single copy of the common data is included in the combined image. Those skilled in the art will appreciate that there are other methods for combining application programs and/or operating systems to reduce file redundancy.

In one embodiment, the compressed image 404 is segmented into a plurality of segments each of which are compressed separately from the other segments. For example, each segment may store thirty-two kilobytes of data prior to compression. The size of each segment is configurable based on performance, compression results, or any other metric or statistic.

As described with reference to FIG. 2, the descriptive data identifies the segments. For example, the descriptive data may include an offset table with each entry in the table identifying a location of one or more of the segments. For example, the offset table may include pointers pointing to one or more of the segments. During execution, an embodiment of the invention software only uncompresses those segments storing desired data as opposed to uncompressing the entire image 404 to obtain the desired data. The compression scheme may include any compression algorithm such as an algorithm using Lempel Ziv compression or variants thereof Alternatively or in addition, the boot environment and the software image may be compressed separately.

EXAMPLES

The following examples further illustrate embodiments of the invention. In operation, computer 130 executes computer-executable instructions such as those illustrated in FIG. 3 to access the compressed image to identify the boot environment stored in the compressed image, to load the compressed image as a file system, and to boot the identified boot environment via the file system to install the software image on a computer.

Embodiments of the invention include a system for booting from the compressed image comprising the boot environment and the software image stored on the computer-readable medium. The system includes the driver component and/or other computer-executable instructions that constitute means for identifying the boot environment in the compressed image, means for loading the compressed image as a file system, and means for booting from the identified boot environment loaded as a file system to install the software image on a computer. The system executes in the context of a running operating system. Structures corresponding to the means listed above further include the elements illustrated in the figures and described herein.

In one example, all the boot files may be archived or packaged into a single compressed image (e.g., such as by using a "zip" program, by using "tar" in UNIX operating systems, or by using any other type of binary compression application). The driver component according to an embodiment of the invention interprets the compressed image as a file system to allow a boot driver or loader to issue commands to boot from the compressed image.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more computer-readable storage media having one or more computer-executable components for accessing a compressed image, where said compressed image was compressed using a compression algorithm, said components comprising a driver component for:

reading the compressed image, said compressed image comprising a header, a boot environment and a software image, said boot environment and software image comprising a plurality of files combined to reduce file redundancy, wherein data of said boot environment and said software image which is common to both the software image and the boot environment is stored only once in the compressed image;

identifying the boot environment in the compressed image, wherein identifying comprises searching the header for a boot specifier indicating the location of the boot environment on the computer-readable storage media;

loading the compressed image as a file system wherein the data in the loaded image of said boot environment and said software image which is common to both the software image and the boot environment is loaded only once; and booting from the identified boot environment via the file system.

2. The computer-readable storage media of claim 1, wherein the driver component further performs one or more of the following: installing a software image on a computer, system preparation, and system maintenance.

3. The computer-readable storage media of claim 1, wherein the driver component is loaded in one or more of the following ways: by a boot-time driver, and on top of a file system stack in the boot environment.

4. The computer-readable storage media of claim 1, wherein the driver component executes in the context of a running operating system.

5. The computer-readable storage media of claim 1, wherein the driver component is embodied in one or more of the following: software, firmware, and hardware.

6. The computer-readable storage media of claim 1, wherein the compressed image stores descriptive data and file data.

7. The computer-readable storage media of claim 6, wherein the descriptive data comprises metadata including one or more of the following: a file name, an attribute, a file update time, a compression format, a file location and a stream.

8. The computer-readable storage media of claim 6, wherein the file data comprises at least one of binary file data and textual file data.

9. A computer-readable storage medium having stored thereon a data structure representing a compressed image, where said compressed image was compressed using a compression algorithm, said data structure comprising:

a boot environment in the compressed image; and a software image in the compressed image, wherein said boot environment and said software image comprise a plurality of files combined to reduce file redundancy, wherein data of said boot environment and said software image which is common to both the software image and the boot environment is stored only once in the compressed image.

10. The computer-readable storage medium of claim 9, further comprising a driver component intercepting communications between the boot environment and the software image to boot the software image.

11. The computer-readable storage medium of claim 10, wherein the driver component loads the data structure as a file system.

12. The computer-readable storage medium of claim 9, wherein the boot environment comprises a minimal operating system.

13. The computer-readable storage medium of claim 9, wherein the boot environment and software image are stored in the data structure as one or more compressed segments.

14. The computer-readable storage medium of claim 13, further comprising an offset table including a plurality of entries, each of said entries identifying a location of one or more of the segments.

15. The computer-readable storage medium of claim 13, wherein each of the segments comprises thirty-two kilobytes.

16. The computer-readable storage medium of claim 9, wherein the boot environment and the software image are compressed separately in the data structure.

17. A computerized system for booting from a compressed image, where said compressed image was compressed using a compression algorithm, said system comprising:

means for reading the compressed image, said compressed image comprising a header, a boot environment and a software image, said boot environment and software image comprising a plurality of files combined to reduce file redundancy, wherein data of said boot environment and said software image which is common to both the software image and the boot environment is stored only once in the compressed image:

means for identifying a boot environment in the compressed image, wherein identifying comprises searching the header for a boot specifier indicating the location of the boot environment on the computer-readable storage media;

means for loading the compressed image as a file system, wherein the data in the loaded image of said boot environment and said software image which is common to both the software image and the boot environment is loaded only once; and means for booting from the identified boot environment via the file system.

18. The system of claim 17, further comprising descriptive data for the boot environment and software image including one or more of the following: a file name, an attribute, a file update time, a compression format, a file location and a stream.

19. The system of claim 17, further comprising means for performing one or more of the following: installing a software image on a computer, system preparation, and system maintenance.

* * * * *

UNITED STATES PATENT AND TRADEMARK OFFICE
CERTIFICATE OF CORRECTION

| | | |
|---|---|---|
| PATENT NO. | : 7,664,944 B2 | Page 1 of 1 |
| APPLICATION NO. | : 11/459560 | |
| DATED | : February 16, 2010 | |
| INVENTOR(S) | : Wesley G. Miller et al. | |

It is certified that error appears in the above-identified patent and that said Letters Patent is hereby corrected as shown below:

In column 12, line 31, in Claim 17, delete "image:" and insert -- image; --, therefor.

Signed and Sealed this
Eighth Day of February, 2011

David J. Kappos
*Director of the United States Patent and Trademark Office*